3,332,952
LEVOROTATORY 6-METHYL RESERPINE
Leon Velluz, Paris, and Georges Muller, Nogent-sur-Marne, France, assignors to Roussel-UCLAF, Paris, France, a corporation of France
No Drawing. Filed Feb. 11, 1964, Ser. No. 343,942
Claims priority, application France, Feb. 20, 1958, 758,675
4 Claims. (Cl. 260—287)

This application is a continuation-in-part of commonly assigned application Ser. No. 794,221, now abandoned.

The present invention relates to new compounds of the reserpine series having the general formula

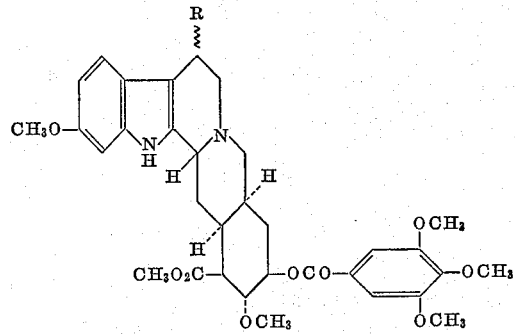

wherein R is selected from the group consisting of a methyl radical and the symbol ξ denotes an α or β configuration and more particularly to 6-methyl reserpine and its stereoisomers.

It is an object of the present invention to provide new pharmaceutical compositions comprising a new compound of the formula

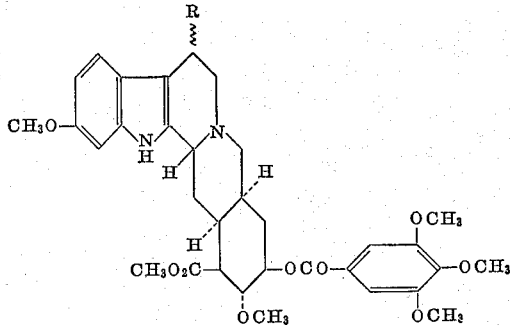

wherein R is selected from the group consisting of a methyl radical and the symbol ξ denotes an α or β configuratilon which possesses a hypotensive and neurodepressive effect more intensive and more prolonged than those of reserpine.

They can be used in the treatment of neurasthenia, anguish, nervous states and another forms of psychopathia. They can be administered at lower doses and, therefore, the secondary effects of reserpine, such as prostration, loss of appetite, diarrhea and so on, could not appear.

In any case the compounds of the invention possess a valuable tranquilizing effect.

A further object of the invention is to provide new and valuable 6-methyl reserpine compounds and their stereoisomers.

Other objects of the present invention and advantageous features thereof will become apparent as the description proceeds.

In principle the present invention is concerned with 6-methyl reserpine of the Formula II.

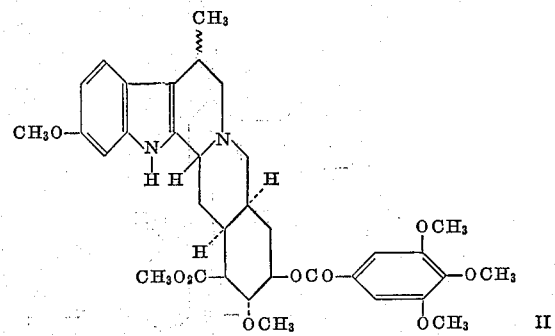

II

Said 6-methyl reserpine is prepared according to the flow diagram of Table I.

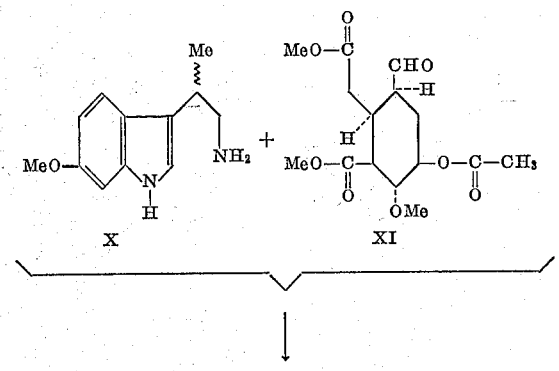

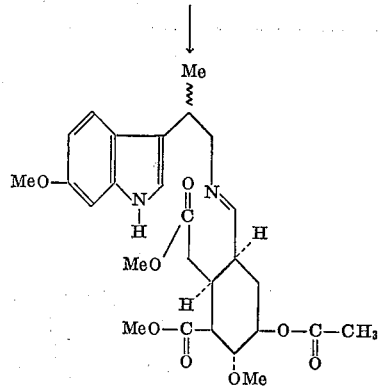
III
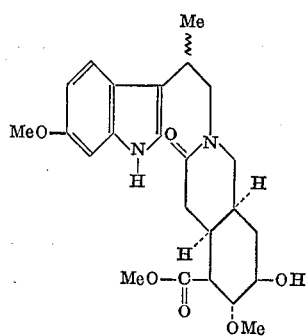
IV
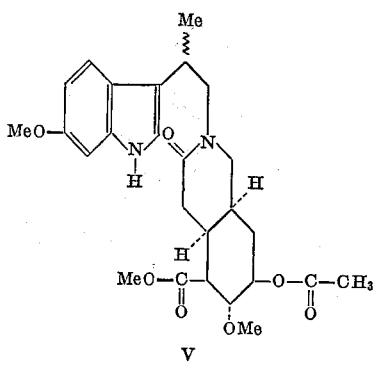
V
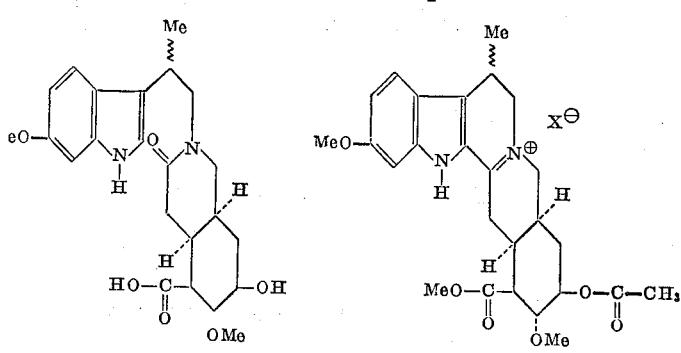
XII     VI

XII
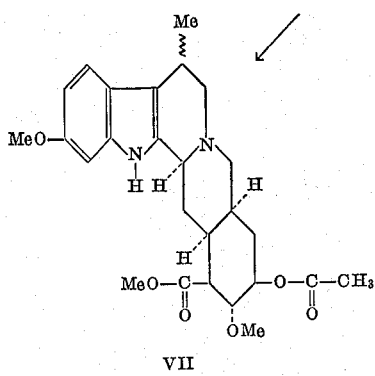
VII
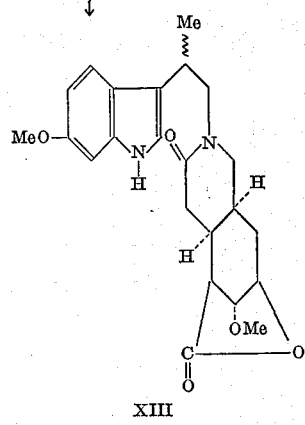
XIII
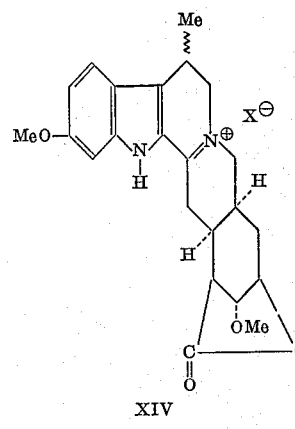
XIV
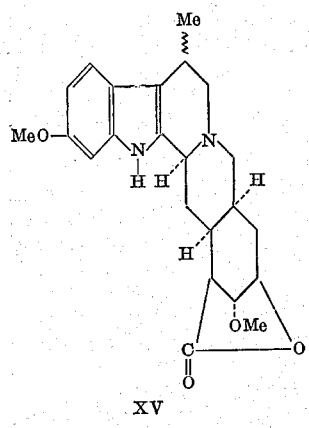
XV

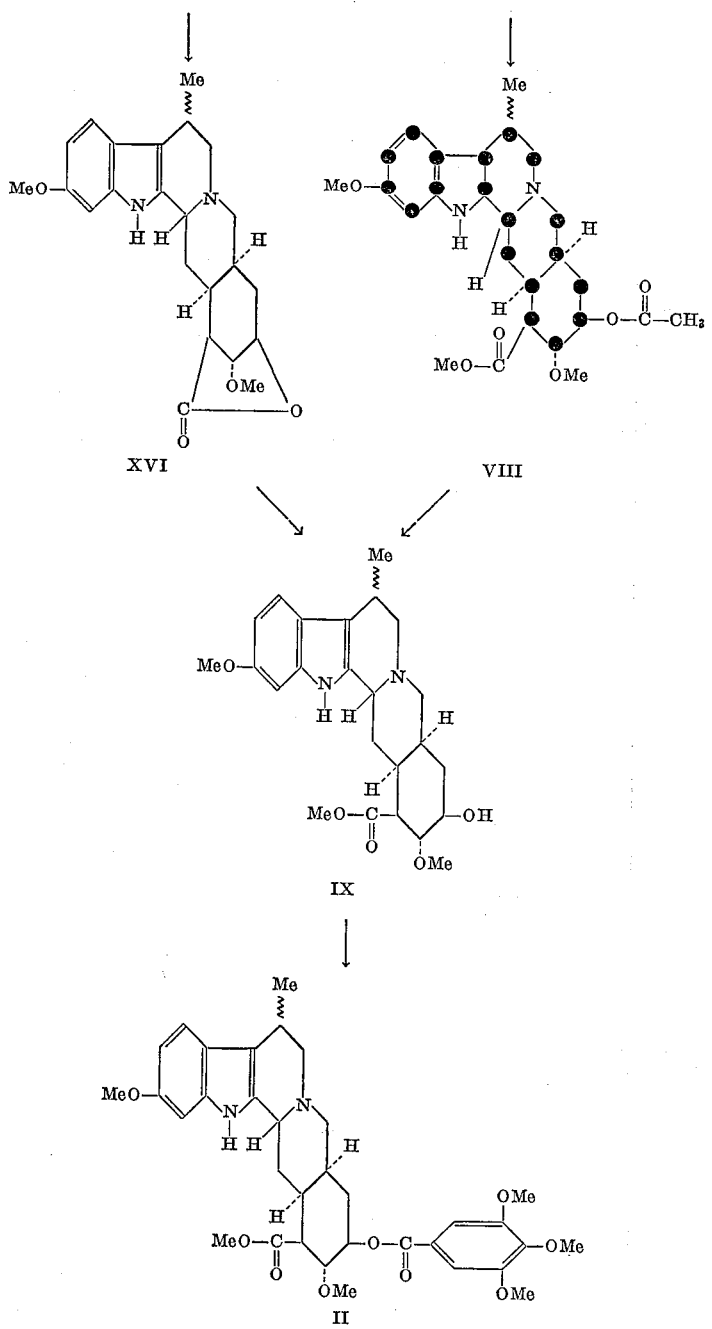

The new 6-methyl reserpine compounds according to the present invention are compounds of a series which e unknown until now; they are substituted in ring C. These new 6-methyl reserpine compounds which are rorotatory in chloroform, correspond to Formula II. They are obtained in two stereoisomeric forms with respect to the α- or β-position of the methyl group on rbon atom 6. The isomer the rotatory power of which $[\alpha]_D^{20}=-87°$ (concentration: 0.25% in chloroform) l be designated hereinafter and in the claims as 6a-thyl reserpine (IIa) and the isomer the rotatory power which $[\alpha]_D^{20}=-134°$ (concentration: 0.5% in chloroform) will be designated as 6b-methyl reserpine (IIb).

In the same manner, a distinction will be made between the intermediates prepared in the course of the thesis of said 6-methyl reserpine compounds by dividing them into intermediates of the a-series and of the b-ies in accordance with their convertibility into 6a- or methyl reserpine.

In principle, the process according to the present invention, consists essentially in condensing the racemic 2-(6′-methoxy-3′-indolyl)-1-propylamine of Formula X with the methyl ester of 1β-carboxy methyl-2β-methoxy carbonyl-3α-methoxy-4β acetoxy-6β-formyl cyclohexane, said acid having an optional rotation $[\alpha]_D^{20}=+42.5°$. (concentration: 1% in pyridine.)

Said 2-(6′-methoxy-3′-indolyl)-1-propylamine is prepared according to copending, commonly assigned, patent application Ser. No. 760,577 of Andre Allais, filed Sept. 12, 1958 and entitled "Tryptamine Compound and Process of Producing Same," now abandoned. For this purpose a primary lower alkyl magnesium halogenide, such as ethyl magnesium iodide, preferably in anisole, is reacted with 6-methoxy indole. The resulting 6-methoxy indolyl magnesium halogenide is condensed at a low reaction temperature with α-bromo propionitrile. The condensation product, i.e., 2-(6′-methoxy-3′-indolyl) propionitrile is extracted from the reaction mixture by means of methylene chloride and is then reduced by means of hydrogen in the presence of a nickel catalyst and in an alcoholic ammonia solution. The resulting 2-(6'-methoxy-3'-indolyl)-1-propylamine is isolated and crystallized as the picrate. The crystalline picrate is then decomposed by the action of an alkali metal hydroxide, preferably by means of lithium hydroxide, and the free 2-(6'-methoxy-3'-indolyl)-1-propylamine is extracted from the decomposition mixture by means of methylene chloride. The other condensation component, the methyl ester of 1β-carboxy methyl-2β-methoxy carbonyl-3α-methoxy-4β-acetoxy-6β-formyl cyclohexane is prepared according to copending, commonly assigned patent application Ser. No. 727,780 of Robert Joly, Georges Muller and Julien Warnant, filed Apr. 11, 1958, and entitled "Process of Producing 1β-Carboxymethyl-2β - Methoxy-Carbonyl-3-Methoxy-4β-Acetoxy-6β - Formyl Cyclohexane," now Patent No. 2,971,978.

The condensation, carried out in a neutral solvent such as methylene chloride, gives a mixture of isomers, at the carbon atom 6, of the methyl ester of 18β-acetoxy-11,17α-dimethoxy - 16β - methoxy carbonyl-6-methyl-2-3-,3-4-di-seco-$\Delta^{4(21)}$-20α-yohimbene-3-oic acid III, which is subjected to the action of an alkali metal borohydride in an alcoholic solution. By reduction of the double bond and subsequent cyclization accompanied by partial saponification, 18β-hydroxy-11,17α-dimethoxy-16β-methoxy carbonyl - 6 - methyl-3-oxo-2-3-seco-20α-yohimbane, is obtained. Said compound is reacetylated to 18β-acetoxy-11,17α - dimethoxy-16β-methoxy carbonyl-6-methyl-3-oxo-2-3-seco-20α-yohimbane V, and the two stereoisomers, Va and Vb, are separated by utilizing the insolubility of the first mentioned isomer in ethyl acetate. The rest of the synthesis can be effected by directly cyclizing the stereoisomers, V, with phosphorous oxychloride to the corresponding 18β - acetoxy-11, 17α - dimethoxy-16β-methoxy carbonyl-6-methyl-$\Delta^3$, 20α-yohimbene (quaternary base), VI. Reduction of said compound with zinc yields 18β-acetoxy-11, 17α-dimethoxy - 16β - methoxy carbonyl-6-methyl-3β, 20α-yohimbane VIII, which is separated from its 3α-isomer of Formula VII by crystallization from methylene chloride. Compound VIII, is partially saponified to 18β-hydroxy-11,17α-dimethoxy-16β-methoxy-carbonyl-6-methyl-3β, 20α-yohimbane, IX. Esterification of said compound according to known procedure yields the desired levorotatory 6-methyl reserpine, II.

The 18β-hydroxy-11,17α-dimethoxy-16β-methoxy carbonyl-6-methyl-3β,20α-yohimbane, IX, can equally well be obtained by saponifying the stereoisomers of 18β-acetoxy-11,17α - dimethoxy-16β-methoxy carbonyl-6-methyl-3-oxo-2,3-seco-20α-yohimbane, V, to 16β-carboxy-18β-hydroxy-11,17α - dimethoxy-6-methyl-3-oxo-2-3-seco-20α-yohimbane, XII, which, after lactonization, XIII, is cyclized by means of phosphorous oxychloride to the lactone of 16β-carboxy-18β-hydroxy - 11,17α - dimethoxy-6-methyl-$\Delta^3$,20α-yohimbene (quaternary base) XIV. Said lactone is reduced by means of an alkali metal borohydride, the resulting lactone of 16β-carboxy-18β-hydroxy-11,17α-dimethoxy-6-methyl-20α-yohimbane, XV, is obtained, said compound is isomerized by the action of formic acid to the lactone of 16β-carboxy-18β-hydroxy-11,17α-dimethoxy-6-methyl-3β, 20α-yohimbane, XVI and this latter compound is then subjected to methanolysis to yield 18β - hydroxy - 11,17α-dimethoxy-6β-methoxy-carbonyl-6-methyl-3β,20α-yohimbane, IX.

The two stereoisomers of the levorotatory 6-methyl reserpine belong to the group of physiologically active compounds of the reserpine family and possess interesting pharamacodynamic properties which are more intensive and more prolonged than those of reserpine.

The following examples serve to illustrate the present invention, without, however, limiting the same thereto. The melting points are points of instantaneous melting determined on the Maquenne block.

EXAMPLE 1

*Preparation of the methyl ester of 18β-acetoxy-11,17α-dimethoxy-16β-methoxy carbonyl - 6 - methyl-2-3, 3-4-di-seco-$\Delta^{4(21)}$-20α-yohimbene-3-oic acid, III*

24 g. of dextrorotatory 1β-carboxy methyl-2β-methoxy carbonyl-3α-methoxy-4β-acetoxy-6β-formyl cyclohexane prepared according to the above mentioned copending patent application Ser. No. 727,780, now U.S.P. 2,971,978 are methylated by reaction with diazomethane in methylene chloride. Excess reactant is driven off under vacuum, and 12 g. of racemic 2-(6'-methoxy-3'-indolyl)-1-propylamine, X, prepared according to the above mentioned copending patent application Ser. No. 760,577, now abandoned, dissolved in methylene chloride are added thereto. The reaction mixture is allowed to stand for one hour at room temperature. The resulting crude product III is used without further purification in the following reaction. The two $C_6$-isomers obtained thereby have not been described in the literature.

EXAMPLE 2

*Preparation of 18β-hydroxy - 11,17α - dimethoxy-16β-methoxy carbonyl - 6 - methyl-3-oxo-2-3-seco-20α-yohimbane, IV*

The solution of compound III, obtained according to the preceding example from 12 g. of compound X, is added with cooling to 120 cc. of methanol and 6 g. of potassium borohydride. The mixture is allowed to stand a few minutes, methylene chloride is distilled off, and the remaining methanol solution is heated under reflux for one hour. After cooling, the mixture is poured into water and the solution extracted with methylene chloride. The extracts are washed first, with 2 N hydrochloric acid and then with water, dried and distilled to dryness. The resulting resin is subjected to a chromatographic treatment through neutral alumina and is eluted with methylene chloride containing 2% methanol, in order to recover 25 g. of compound IV. The mixture containing the two $C_6$-isomers has not been described in the literature.

EXAMPLE 3

*Preparation of 18β-acetoxy - 11,17α - dimethoxy-16β-methoxy carbonyl-6-methyl-3-oxo-2-3-seco-20α-yohimbane of Formula V, and separation of the $C_6$-isomers*

25 g. of compound IV, prepared according to the preceding example, are mixed with 100 cc. of pyridine and 50 cc. of acetic acid anhydride and the solution is heated at 60° C. for 15 minutes. Thereafter it is distilled to dryness under vacuum, and after addition of 50 cc. of ethyl acetate, the remainder of the acetic acid anhydride is carried over by a new distillation under vacuum. The residue, dissolved in 70 cc. of hot ethyl acetate, has ether slowly added thereto until the mixture becomes slightly turbid. The reaction mixture is allowed to crystallize for some time, vacuum filtered, washed with a mixture of ethyl acetate and ether (4.6), dried, and 6.8 g. of one of the isomers of compound V are obtained; melting point: 208° C., $[\alpha]_D^{20} = +31°$ (0.25% in pyridine), which will be designated hereinafter as Va. Concentration of the mother-liquors and addition of ether yields a second and third portion of the same compound, thus bringing the total yield to 9.3 g. (being 64%). After recrystallization from aqueous methanol, the compound is obtained in the form of small colorless prisms, soluble in chloroform and alcohol and almost insoluble in ether. Its infra-red spectrum confirms the structure indicated.

*Analysis.*—$C_{26}H_{34}O_7N_2$; molecular weight: 486.55— Calculated: 64,18% C; 7.04% H; 5.76% N. Found: 64.2% C; 7.1% H; 5.9% N.

The mother liquor, distilled to dryness, yields 12 g. of a resin which consists mainly of the other isomer and which will be designated hereinafter as Vb. This compound can be used without further purification in the following reaction step of the synthesis (see Example 9).

The two isomers Va and Vb have not been described in the literature.

EXAMPLE 4

*Preparation of 18β-acetoxy-11,17α-dimethoxy-16β-methoxy carbonyl-6a-methyl-Δ³,20α-yohimbene (quaternary base) VIa*

4 g. of compound Va, prepared according to the preceding example, are heated under reflux for one and one-half hours in 40 cc. of phosphorus oxychloride. The reaction mixture is then distilled to dryness in a vacuum, the residue is dissolved in ethyl acetate and ether is added until the solution becomes slightly turbid. After crystallization, the precipitate is vacuum filtered, washed with ethyl acetate, and dried, 4.6 g. (quantitative yield) of a mixed salt of the quaternary base VIa are obtained; melting point: 150° C., then 210–220° C. This compound, which is new, is obtained in the form of crystals soluble in ethyl acetate and insoluble in ether.

The product is new.

EXAMPLE 5

*Preparation of 18β-acetoxy-11,17α-dimethoxy-16β-methoxy carbonyl-6a-methyl-3α,20α-yohimbane VIIa*

To 400 mg. of compound VIa, prepared according to the preceding example, in 4 cc. of methanol and 1 cc. of water, there is slowly added potassium borohydride until pH of 10.0 is attained. The compound crystallizes. After adding water, it is vacuum filtered, made into a paste with water, again vacuum filtered, and dried. 230 mg. (being 75%) of the crystals of VIIa are obtained; melting at 250° C., soluble in chloroform and insoluble in ether. Its infra-red spectrum is in agreement with the indicated structure and confirms, in particular, the 3α-configuration.

This compound has not been described in the literature.

EXAMPLE 6

*Preparation of 18β-acetoxy-11,17α-dimethoxy-16β-methoxy carbonyl-6α-methyl-3β,20α-yohimbane, VIIIa*

The following mixture is prepared:

| | |
|---|---|
| Quaternary base obtained according to Example 4 _____g__ | 4.6 |
| Acetone _____cc__ | 46 |
| 1 N perchloric acid _____cc__ | 46 |
| Zinc _____g__ | 9.2 |
| Ferric chloride solution, 45° Bé. _____cc__ | 0.46 |

The mixture is heated under reflux until the organic matter is dissolved. Heating is then continued for about 5 minutes. Zinc is separated by decanting and the acetone solution is concentrated under vacuum. After addition of water, the mixture is extracted with methylene chloride and the extract is washed with ammonia. It is distilled to dryness in a vacuum and the residue is taken up with a few cc. of methyene chloride. Crystallization occurs. After filtering and rinsing with methylene chloride, the crystals are dried. 1.240 g. of 18β-acetoxy-11,17α-dimethoxy-16β-methoxy carbonyl-6a-methyl-3β,20α-yohimbane, VIIIa, are obtained. The product is purified by recrystallization from acetone. The compound, which is new, is obtained in the form of colorless crystals; melting point: 200° C., $[\alpha]_D^{20} = -96°$ (0.2% in pyridine), soluble in acetone and chloroform and insoluble in water and ether.

*Analysis.*—$C_{26}H_{34}O_6N_2$; molecular weight: 470.55— Calculated: 66.36% C; 7.284% H; 5.95% N. Found: 65.5% C; 7.3% H; 6.0% N.

18β-acetoxy-11,17α-dimethoxy-16β-methoxy carbonyl-6-methyl-3α,20α-yohimbane, VIIa, may be recovered by subjecting the mother liquors of the 3β-isomer, VIIIa, to chromatographic treatment on alumina.

EXAMPLE 7

*Preparation of 18β-hydroxy-11,17α-dimethoxy-16β-methoxy carbonyl-6a-methyl-3β,20α-yohimbane, IXa*

A mixture of 1 g. of compound VIIIa, prepared according to the preceding example, 20 cc. of methanol, and 500 mg. of potassium borohydride is heated under reflux. After heating for 3 hours, the reaction mixture is concentrated and water and methylene chloride are added. The methylene chloride layer is separated, washed with water, and distilled to dryness. The resulting colorless resin, weighing 1.1 g. consists of the compound IXa which is used without further purification in the esterification.

This compound has not been described in the literature.

EXAMPLE 8

*Preparation of levorotatory 6a-methyl reserpine, IIa*

A mixture of 1.1 g. of compound IXa, obtained in the form of a resin according to the preceding example, 10 cc. of pyridine, and 2.5 g. of 3,4,5-trimethoxy benzoyl-chloride is heated at 75° C. for 16 hours in a nitrogen atmosphere. After cooling, a few cc. of water are added; the mixture is allowed to stand for one hour and is then poured on ice. The resulting mixture is acidified by the addition of hydrochloric acid to a pH of 1.0 and is extracted with methylene chloride. The extracts are washed with water, ammonia, and again with water, and distilled to dryness. The residue is dissolved in methanol and nitric acid is added thereto yielding a nitrate which is vacuum filtered and dried. A paste is made with a few cc. of acetone, ammonia is added until it dissolves, then some water. Crystallization is caused to set in by scratching and, after vacuum filtering, 730 mg. (44% calculated for compound VIIIa) of 6a-methyl reserpine, IIa, are obtained. This compound is obtained in two different crystal forms; those obtained by recrystallization from methanol melting at 150° C., whereas recrystallization from a mixture of ethy acetate and ether (4:6) yields another variety melting at 223° C., $[\alpha]_D^{20} = -85° \pm 5°$ (0.25% in chloroform). The compound which has not been described in the literature, is soluble in alcohol, acetone, and chloroform, and insoluble in ether.

*Analysis.*—$C_{34}H_{42}O_9N_2$; molecular weight: 622.69— Calculated: 65.58% C; 6.80% H; 23.13% O; 4.50% N. Found: 65.4% C; 6.8% H; 22.8% O; 4.4% N.

Its infra-red spectrum confirms the given structure (see also Example 15.)

EXAMPLE 9

*Preparation of 16β-carboxy-18β-hydroxy-11,17α-dimethoxy-6b-methyl-3-oxo-2-3-seco-20α-yohimbane, XIIb*

12 cc. of 10 N sodium hydroxide solution are added to 12 g. of compound Vb, prepared in the form of a resin according to Example 3, in 85 cc. of methanol and 14 cc. of water. The mixture is refluxed for one hour. After concentrating and acidifying the mixture by the addition of hydrochloric acid, it is extracted with ethyl acetate, salted out by the addition of salt water, and distilled to dryness. The residue, 10 g. of a brown resin, consists of the compound XIIb, which is new.

EXAMPLE 10

*Preparation of the lactone of 16β-carboxy-18β-hydroxy-11,17α - dimethoxy - 6b - methyl - 3 - oxo - 2 - 3 - seco-20α-yohimbane, XIIIb*

2 g. of the compound XIIb, prepared according to the preceding example, are mixed with 20 cc. of acetic acid, 20 cc. of acetic acid anhydride, and 1 g. of lithium acetate. The resulting solution is heated at 80° C. for 2 hours. After cooling and adding 20 cc. of water, the mixture is allowed to stand at room temperature for one hour, poured on ice, neutralized by the addition of ammonia, and extracted with methylene chloride. The extracts, washed with salt water, dried and filtered, are

13 subjected to a chromatographic treatment over alumina. Eluting with methylene chloride containing 1% of methanol yields 1.0 g. of the compound XIII$b$ which is used as such in the following reaction step.

EXAMPLE 11

*Preparation of the lactone of 16β-carboxy-18β-hydroxy-11,17α - dimethoxy - 6b - methyl - Δ³,20α - yohimbene, XIVb*

1 g. of the compound XIII$b$, prepared according to the preceding example, is introduced into 20 cc. of phosphorus oxychloride and refluxed in a nitrogen atmosphere for 2 hours. After distillation in a vacuum, a resin representing the compound XIV$b$ is obtained, which is new.

EXAMPLE 12

*Preparation of the lactone of 16β-carboxy-18βhydroxy-11,17α - dimethoxy - 6b - methyl - 3α,20α - yohimbane, XVb*

The compound XIV$b$, prepared from 1 g. of the compound XIII$b$ according to the preceding example, is dissolved in 20 cc. of methanol. 2 cc. of water are admixed thereto and then potassium borohydride is added portion by portion until the pH is about 9.0. After precipitation with water, the mixture is extracted with methylene chloride. The dried extracts are filtered and distilled to dryness in a vacuum. The residue is crystallized from aqueous methanol. The crystals are vacuum filtered, dried and 730 mg. of the compound XV$b$ are obtained (being 65% calculated from the compound XIII$b$ and 35% calculated from the starting racemic amine X).

EXAMPLE 13

*Preparation of the levorotatory lactone of 16β-carboxy-18β - hydroxy - 11,17α - dimethoxy - 6b - methyl-3β,20α-yohimbane, XVIb*

700 mg. of the lactone XV$b$ prepared according to the preceding example, are refluxed in 7 cc. of formic acid for 30 minutes. After cooling, the reaction mixture is poured on ice and rendered alkaline by the addition of ammonia. Crystallization is initiated by scratching. The crystals are vacuum filtered and dried to yield 550 mg. (being 80%) of the compound XVI$b$. Said crystals are redissolved in hot methylene chloride, and by concentrating and adding methanol, spontaneous crystallization sets in. The first crystal portion furnished by vacuum filtering weights 450 mg. (70%). The compound XVI$b$ (melting point: 280° C., optional rotation $[\alpha]_D^{20} = -20° \pm 5°$ (0.25% in pyridine) is a new compound. It is slightly soluble in acetone, alcohol, or chloroform and insoluble in ether.

*Analysis.*—$C_{23}H_{28}O_4N_2$, molecular weight: 396.47—Calculated: 69.67% C; 7.12% H; 16.14% O; 7.07% N. Found: 69.7% C; 7.3% H; 16.5% O; 7.0% N.

Its infrared spectrum confirms the structure given.

EXAMPLE 14

*Preparation of 18β-hydroxy-11,17α-dimethoxy-16β-methoxy carbonyl-6b-methyl-3β,20α-yohimbane, IXb*

400 mg. of the compound XVI$b$ prepared according to the preceding example, are mixed with 20 cc. of methanol containing 4 mg. of sodium and refluxed for 2 hours. The resulting reaction mixture is concentrated, cooled, adjusted to a pH of 3.0 by the addition of acetic acid, then rendered alkaline by ammonia until the pH is 9.0. The mixture is extracted with methylene chloride. The extracts are dried over magnesium sulfate and are evaporated by distillation to dryness. The residue, 450 mg. of a clear yellow resin, is the compound IX$b$. This compound is new and can be used as such in subsequent reaction steps.

14

EXAMPLE 15

*Preparation of the levorotatory (chloroform) 6b-methyl reserpine, IIb*

4.5 cc. of pyridine and 1 g. of 3,4,5-tri-methoxy benzoylchloride are added to 450 mg. of the compound IX$b$, obtained in the form of a resin according to the preceding example. The mixture is heated at 75° C. for 16 hours, cooled and, after the addition of a few cc. of water, is allowed to stand (at 40° C.) for one hour. Thereafter, the mixture is poured on ice, acidified with sulfuric acid to a pH of 1.0 and extracted with methylene chloride. The extracts, washed with water, ammonia, and again with water, are dried, passed through alumina, vacuum filtered, and then evaporated to dryness by distillation in a vacuum. A few drops of concentrated nitric acid are added to the residue dissolved in methanol. The nitrate crystallizes on scratching. It is vacuum filtered, suspended in methanol, and ammonia is added drop by drop until the pH is 9.0. First dissolution takes place, then spontaneous crystallization. The mixture is cooled with ice, vacuum filtered, dried and 270 mg. of 6b-methyl reserpine are obtained (corresponding to a yield of 44%, calculated from the compound XVI$b$). The compound is recrystallized from acetone, with filtering, concentrating, and adding methanol. Yield: 215 mg. (80%). Melting point 220° C., optical rotation $[\alpha]_D^{20} = -134° \pm 5°$ (0.5% in chloroform). This compound, which has not been described in the literature, is soluble in chloroform, slightly soluble in alcohol and acetone, and insoluble in ether.

*Analysis.*—$C_{34}H_{42}O_9N_2$; molecular weight: 622.69—Calculated: 65.58% C; 6.80% H; 4.5% N. Found: 66.0% C; 6.8% H; 4.7% N.

Its infra-red spectrum confirms the assumed structure and distinguishes said 6b-methyl derivative from its 6a-isomer described in Example 8.

EXAMPLE 16

*Preparation of 6-ethyl - 18β - acetoxy-11,17α-dimethoxy-16β - methoxy carbonyl-(2-3),(3-4)-diseco-Δ⁴⁽²¹⁾,20α-yohimbene-3-carboxylic acid of Formula XIX*

7.2 g. of 1β-carboxy methyl-2β-methoxy carbonyl-3α-methoxy-4β-acetoxy-6β-formyl cyclohexane (dextrorotatory in pyridine) of Formula XVIII prepared, for instance, according to copending, commonly assigned patent application Ser. No. 727,780, filed Apr. 11, 1958, now U.S. No. 2,971,978, are introduced into a mixture containing 14.4 cc. of water and 3.6 cc. of dimethylformamide. While cooling the mixture, 7.2 cc. of triethylamine are added drop by drop, followed by the addition of a paste of 11 cc. of dimethylformamide, 6 cc. of water, and 6 g. of the acetate of 2-(6'-methoxy-3'-indolyl)-1-butylamine of Formula XVII prepared, for instance, according to the abovementioned copending patent application Ser. No. 797,887, now abandoned. The mixture is stirred at $-5°$ C. for 20 minutes. The resulting solution is used directly in the following reaction step. Said compound of Formula XIX is a new compound.

EXAMPLE 17

*Preparation of 6 - ethyl-18β-acetoxy-11,17α-dimethoxy-16β - methoxy carbonyl-(2-3),(3-4)-diseco-20α-yohimbane-3-carboxylic acid of Formula XX*

The Schiff base of Formula XIX, prepared according to Example 16, is treated at a temperature of $-5°$ C. with 2.4 g. of potassium borohydride for 15 minutes. Stirring of the mixture is continued for 30 minutes at room temperature and the reaction mixture is then cooled to $+5°$ C. After neutralization with 8 cc. of acetic acid to a pH of 6.0–7.0, 15 cc. of water are added. The resulting mixture is directly used in the following reaction step. The compound of Formula XX has not been previously described.

EXAMPLE 18

Preparation of 6 - ethyl-11,17α-dimethoxy-16β-methoxy carbonyl-18β-acetoxy-2,3-seco-3-oxo-20α-yohimbane of Formula XXI and separation of its isomers.

The mixture obtained according to the preceding example is heated at 80° C. for 75 minutes. It is then cooled in ice and 100 g. of ice are added thereto. The solid precipitate is filtered off, washed with water, and dissolved in chloroform. The chloroform solution is washed with 2 N ammonia solution, water, 2 N hydrochloric acid, and again with water, dried over magnesium sulfate, and evaporated to dryness in a vacuum. 12.5 g. of a resinous product are obtained which is dissolved in benzene. The benzene solution is passed through 500 g. of chromatographic alumina according to the Brockmann method. The alumina is eluted first with 5,700 cc. of methylene chloride containing 5% of ethyl acetate. The eluates are collected. After evaporation to dryness in a vacuum, 6.2 g. of a resinous product are obtained which is used directly in the subsequent reaction step. Elution is then continued with 500 cc. of methanol, and, after evaporation to dryness of the eluates, 2.9 g. of a resinous product are recovered which consists of the 6-position isomer of 6-ethyl-1,17α-dimethoxy-16β-methoxy carbonyl-18β-acetoxy-2,3-seco-3-oxo-20α-yohimbane of Formula XXI. This compound may be worked up in accordance with the technique described hereinafter and yields thereby an isomeric form of 6-ethyl reserpine.

The compound of Formula XXI is a new compound.

EXAMPLE 19

Preparation of 6 - ethyl-11,17α-dimethoxy-16β-carboxy-18β-hydroxy-2,3-seco-3-oxo-20α-yohimbane of Formula XXII 6.2 g. of the resinous product obtained from the eluate with methylene chloride containing 5% of ethyl acetate, as described in the preceding example, are dissolved in 3 cc. of methanol. A mixture of 6.6 cc. of a sodium hydroxide solution and 13.4 cc. of water are added thereto and the resulting mixture is refluxed for 80 minutes. The reaction mixture is then cooled in ice and methylene chloride is added to the cooled solution which is then acidified by the addition of concentrated hydrochloric acid (about cc.) to a pH of 1.0.

On extracting with methylene chloride containing 15% of methanol and washing the extracts with salt water, the extracts are filtered, dried over magnesium sulfate, and evaporated to dryness in a vacuum to yield an amorphous residue which is used directly in the following reaction step.

The compound of Formula XXII has not been previously described.

EXAMPLE 20

Preparation of the lactone of 6 - ethyl-11,17α-dimethoxy-16β - carboxy-18β-hydroxy-2,3-seco-3-oxo-20α-yohimbane of Formula XXIII The crude resinous hydroxy acid of Formula XXII prepared according to the preceding example is dissolved by refluxing with 30 cc. of dichloroethane. About 5 cc. of the solvent are distilled off the expel traces of moisture. Thereafter, 10 cc. of acetic acid anhydride, 0.6 g. of sodium acetate containing 0.35% water, and 40 cc. of dichloroethane are added and the mixture is refluxed for 2 hours. After cooling, the solution is extracted with an aqueous solution of sodium bicarbonate, washed with water, dried over magnesium sulfate, and evaporated to dryness in a vacuum. 5.5 g. of an amorphous residue are obtained which is used directly in the following reaction step.

The compound of Formula XXIII is a new compound.

EXAMPLE 21

Preparation of the quaternary base of the lactone of 6-ethyl-11,17α-dimethoxy-16β-carboxy - 18β - hydroxy-$\Delta^{3(4)}$,20α-yohimbene of Formula XXIV 20 cc. of phosphorus oxychloride are added to 5.5 g. of the compound of Formula XXIII prepared according to the preceding example. The mixture is refluxed for 90 minutes, poured in ice and triturated until a dense resinous product is obtained by decanting the supernatant water. The resin is dissolved in methylene chloride. The organic extracts are washed with water, dried over magnesium sulfate, and evaporated to dryness in a vacuum while maintaining the temperature below 20° C.

A dark colored, fluorescent resin is obtained which is used directly in the following reaction step.

The compound of Formula XXIV has not been previously described.

EXAMPLE 22

Preparation of the lactone of 6-ethyl-11,17α-dimethoxy-16β-carboxy-18β-hydroxy-20α-yohimbane of the Formula XXV The quaternary base of Formula XXIV prepared according to the preceding example is dissolved at 0° C. in 25 cc. of methanol. 1.5 cc. of concentrated hydrochloric acid and, thereafter, 2 g. of potassium borohydride in small portions are added thereto while keeping the temperature at 0° C., until the solution is deodorized and its pH-value remains alkaline. 100 cc. of water are added, until complete precipitation of a resin which is then extracted with methylene chloride. The extracts are washed with water, dried, and distilled to dryness to yield 4.7 g. of an amorphous residue which consists of the lactone of Formula XXV and is directly used in the following reaction step.

The compound of Formula XXV is a new compound.

EXAMPLE 23

Preparation of the lactone of 6-ethyl-11,17α-dimethoxy-16β-carboxy-18β-hydroxy-3β,20α-yohimbane of Formula XXVI 2.74 g. of the compound of Formula XXV prepared according to the preceding example are introduced into 27 cc. of formic acid. The mixture is refluxed for 30 minutes and poured in ice. Concentrated ammonia is added until the pH is above 10.0. After extracting the mixture with methylene chloride, the extracts are washed with water, filtered, and evaporated to dryness in a vacuum. 2.7 g. of a product are obtained which is recrystallized from methanol to yield 1.497 g. of the lactone of 6-ethyl - 11,17α - dimethoxy - 16β - carboxy - 18β - hydroxy-3β,20α-yohimbane of Formula XXVI having a melting point of about 150° C. On recrystallization from acetone, the compound is obtained in another crystal form melting at 230° C. The compound is obtained in the form of small, colorless crystals, insoluble in water and ether, slightly soluble in alcohol, acetone, and methanol, and soluble in chloroform. Optical rotation $$[\alpha]_D^{20} = +56\% \pm 2°$$

(concentration: 0.5% in pyridine).

This compound has not been previously described.

EXAMPLE 24

Preparation of 6-ethyl-11,17α-dimethoxy-16β-methoxycarbonyl-18β-hydroxy-3β,20α-yohimbane of Formula XXVII 1.36 g. of the lactone of 6-ethyl-11,17α-dimethoxy-16β-carboxy-18β-hydroxy-3β,20α-yohimbane of Formula XXVI prepared according to the preceding example, are dissolved in 30 cc. of anhydrous methanol. 9 cc. of methanol containing 1 mg./cc. of sodium are added thereto and the mixture is refluxed for 2 hours. The reaction mixture is then poured on ice and extracted with methylene chloride. The extracts are washed with water, filtered, and evaporated to dryness in a vacuum.

1.4 g. of 6-ethyl-11,17α-dimethoxy-16β-methoxy-carbonyl - 18β - hydroxy - 3β,20α - yohimbane of Formula XXVII are obtained. This new compound is obtained, after trituration with ether in the form of small crystals of an indefinite melting point, slightly below 130° C.

EXAMPLE 25

Preparation of 6-ethyl reserpine of Formula I 1.4 g. of the methyl ester of 6-ethyl reserpic acid of Formula XXVII prepared according to the preceding example and 3.5 g. of 3,4,5-trimethoxy benzoylchloride are introduced into 16 cc. of pyridine. A stream of nitrogen is passed into the container which is then closed and heated in an oven at 75° C. for 16 hours. After cooling and adding 15 cc. of water, the mixture is allowed to stand at room temperature for 90 minutes and is then acidified by the addition of hydrochloric acid to a pH of 1.0. The acidified mixture is extracted with methylene chloride and the extracts are washed with water, with dilute ammonia solution, and again with water. The washed extracts are filtered and evaporated to dryness in a vacuum to yield 3 g. of a residue which is dissolved in methylene chloride. The resulting solution is passed through 40 g. of chromatographic alumina according to the Brockmann method. The alumina is then eluted by means of 540 cc. of methylene chloride to produce, after evaporation of the eluate to dryness, 1.75 g. of 6-ethyl reserpine; melting point: about 130° C.; optical rotation $$[\alpha]_D^{20} = -124° \pm 10°$$

(concentration: 0.5% in pyridine).

This new compound is insoluble in ether, petroleum ether, and isopropyl ether.

Esterification of the methyl ester of 6-ethyl reserpic acid of Formula XXVII may advantageously be effected in the presence of a mixture of a pyridine base and triethylamine whereby an especially good yield and pure ester is obtained by proceeding according to copending, commonly assigned patent application Ser. No. 727,782, filed Apr. 11, 1958, now United States Patent No. 2,926,167.

The new 6-methyl reserpine obtained as described above in Examples 8 and 15 is administered to humans and animals in the form of compositions according to the present invention which exhibit all of the characteristic effects of reserpine but distinctly more intense in reaction at comparative dosages.

The new 6-ethyl reserpine obtained as described hereinabove is administered to humans and animals in the form of compositions according to the present invention which exhibit all of the characteristic effects of reserpine but exert a considerably more prolonged activity. On prolonged administration, doses which are four to five times smaller than those of reserpine produced the same clinical results. Thus, the present invention provides drugs of the reserpine series which are more active than reserpine itself and which possesses all the characteristic advantages of the natural alkaloid.

Other advantages of compositions according to the present invention will become apparent to specialists in this field.

In principle, pharmaceutical compositions according to the present invention are prepared by combining 6-methyl reserpine or 6-ethyl reserpine with appropriate pharmaceutical carriers either in the solid form or in the liquid form. Solid compositions may be in the form of tablets, coated tablets, or dragees, lozenges, pills, capsules, or powders, while liquid compositions may be in the form of solutions, emulsions, suspensions, sirups or elixirs. The new compositions may also be used in the form of suppositories or may be administered in any other suitable manner.

For administration in capsule form, a homogeneous dispersion of the active principle in the carrier is prepared. Such a fine dispersion can be achieved, for instance, by intimately mixing and milling the compound in a ball mill with a solid pulverulent extending agent to the desired degree of fineness or by impregnating the already milled, finely powdered, solid carrier with a mixture of the active compound dissolved in water or any other suitable solvent and then removing the water or solvent.

To prepare the solid shaped compositions such as tablets, pills, lozenges, and other solid forms suitable for administration of the active agent, the conventional extending, diluting, binding agents, lubricants and other tableting adjuvants such as sugar, lactose, sorbitol, talc, starch, pectin, gelatin, gum arabic, methyl cellulose, carboxy methyl cellulose, preferably in the form of its sodium salt, yeast extracts, agar, calcium sulfate and calcium carbonate, kaolin, stearic acid, magnesium stearate and/or solubilizing agents, such as alcohol, chloroform, trichloroethylene and the like are used.

The content of active principle in these compositions may vary. It is, of course, necessary that the active compound be present in such an amount that a suitable dosage will be ensured per dosage unit. The content of the new compositions of 6-methyl reserpine or 6-ethyl reserpine may be between about 0.002% and about 10%. Large amounts may, of course, also be incorporated although with such larger amounts accurate dosing will be more difficult.

The average dose of 6-ethyl reserpine is between about 0.1 mg. and about 2 mg. per day, taken subdivided in 3 or 4 doses. The average dose of 6-methyl reserpine is somewhat less.

The present invention comprises not only compositions containing either levorotatory 6-methyl reserpine or levorotatory 6-ethyl reserpine which are the most active pharmacodynamic form but also compositions containing the corresponding racemic mixture. The present invention comprises also compositions which contain as active principle, the inorganic or organic acid addition salts, whether the single salts or the double salts, of 6-methyl reserpine or 6-ethyl reserpine and preferably the acid addition salts obtained with acids such as the salts with hydrochloric acid, hydrobromcic acid, nitric acid, sulfuric acid, phosphoric acid, perchloric acid, acetic acid, citric acid, oxalic acid, tartaric acid, ascorbic acid, methane sulfonic acid hydroxy ethane sulfonic acid, p-toluene sulfonic acid salicylic acid, p-amino salicylic acid, acetyl salicylic acid, or the like.

It is also to be understood that 6-methyl reserpine or 6-ethyl reserpine may be used in combination with other drugs or may be administered to solid or liquid foods without exceeding the scope of the present invention.

The following examples and experimental results will serve to illustrate compositions according to the present invention, without, however, limiting the same thereto. In all the examples the levorotatory 6-ethyl reserpine is used. It may, however, be replaced by twice its amount of the racemic mixture. In addition, obviously, it may be replaced by corresponding amounts of 6-methyl reserpine or its levorotatory form.

EXAMPLE 26

Preparation of tablets 100 g. of 6-ethyl reserpine are mixed with 400 g. of sugar, 8,870 g. of lactose, 4,600 g. of starch, and 130 g of gelatin. The resulting homogeneous powder is moistened, granulated, and passed through an apertured plate or a sieve of screening wire of adequate dimensions.

After drying, the granulated material is ground; 75 g. of talc and 150 g. of magnesium stearate are added as lubricants to said granulated mass. The mixture is then compressed into tablets each weighing 150 mg. and containing 1 mg. of 6-ethyl reserpine.

EXAMPLE 27

Preparation of a solution 10 g. of 6-ethyl reserpine are mixed with 10 g. of tartaric acid, 90 g. of benzyl alcohol, 2,250 g. of polyethylene glycol 400, and with a quantity of distilled water sufficient to produce a volume of 10 l.

The resulting solution contains 0.001 g. per cc. It can be administered both by intravenous and intramuscular injection.

EXAMPLE 28

Tests on animals

In the following experiments 6-methyl reserpine or 6-ethyl reserpine was administered by intraperitoneal injection.

I. EYELID DROOPING TEST

This test is based on the property of reserpine and related compounds of causing drooping of the eyelids. The intensity of this effect is measured by the degree of narrowing of the palpebral slit according to the scale proposed by B. Rubin, M. H. Malone, M. H. Waugh, and C. Burke "J. Pharmacol. Exp. Therap.," vol. 120, page 25 (1957) wherein the various grades indicate the following effects:

Grade 0=no visible effects;
Grade 1=closing of the palpebral slit to one fourth;
Grade 2=closing of the palpebral slit to one half;
Grade 3=closing of the palpebral slit to three fourth;
Grade 4=complete closing of the eyelids.

By adding the grade numbers obtained by examining the eyes of 5 rats, according to the above scale, the degree of sedation may be indicated by the total of said numbers as of any given moment after the injection.

The results of this test with rats shows that 6-ethyl reserpine produces effects which are qualitatively and quantitatively identical to those of reserpine but are of considerably longer duration. It is evident that about 24 hours after the injection, substantially no eyelid drooping effect can be observed on administration of doses of .1 mg./kg. to 1 mg./kg. of reserpine. So very high dosage of reserpine as 2 mg./kg. maintain the sedation during 48 hours at a significant level. In contrast thereto 6-ethyl reserpine administered in the same doses, shows a very significant residual effect which can still be observed even after 120 hours. The resulting data are summarized in the two following schemes.

SCHEME II.—DURATION OF THE SEDATIVE ACTION OF 6-ETHYL RESERPINE

| Drug | Dosage, γ/kg. | Eyelid drooping after— | | | | |
|---|---|---|---|---|---|---|
| | | 24 hrs. | 48 hrs. | 72 hrs. | 96 hrs. | 120 hrs. |
| Reserpine | 1,000 | 6 | 2 | 1 | 0 | 0 |
| | 2,000 | 29 | 15 | 7 | 2 | 2 |
| 6-ethyl reserpine | 1,000 | 31 | 28 | 14 | 3 | 0 |
| | 2,000 | 31 | 30 | 31 | 12 | 2 |

It becomes apparent from this scheme that the action of reserpine is practically insignificant after 24 hours at 1,000 γ/kg. dosage and after 48 hours at 2,000 γ/kg. dosage.

To the contrary 6-ethyl reserpine is still active after 72 hours at 1,000 γ/kg. dosage and after 96 hours at 2,000 γ/kg. dosage.

It is possible to say that 6-ethyl reserpine is not only three to four times more active than reserpine in this test but also that its action is three to four times more prolonged than the action of reserpine at the same dosage.

A comparison of the eyelid drooping effects of 6-ethyl reserpine and of reserpine on administration to mice shows that the results are about the same as those observed on rats.

Doses of 75 and 125 γ/kg. of 6-methyl reserpine to rats produce an effect, measured as indicated above, approximately identical to that given by reserpine at a dose of 500 γ/kg.

When using mice as test animals, the same test indicates that 6-methyl reserpine has an activity substantially double that of reserpine.

II. ROTATING CYLINDER TEST

In this test the depressive effect was determined by the tumbling effect on mice placed in groups of 5 in a horizontal cylinder rotating about its axis. The untreated mice were able to maintain their equilibrium by placing themselves contrary to the movement of the cylinder. The speed of rotation of the cylinder was adjusted in such a manner that the number of falls per animal did not exceed four during a 4 minute test. The abatement of the reflexes increases the number of falls in a manner obviously in relation to the dose of active agent injected, thus making it possible to evaluate the intensity of the action of the compound to be evaluated.

The mice are observed one hour or, respectively, four hours after interaperitoneal injection of the compound to be tested and once every day on four subsequent days.

SCHEME I.—SEDATIVE ACTION OF 6-ETHYL RESERPINE IN COMPARISON WITH THAT OF RESERPINE

| Drug | Dosage, γ/kg. | 1 hr. | 2 hrs. | 3 hrs. | Eyelid Drooping after— | | | | | | | 72 hrs. |
|---|---|---|---|---|---|---|---|---|---|---|---|---|
| | | | | | 4 hrs. | 5 hrs. | 6 hrs. | 7 hrs. | 8 hrs. | 24 hrs. | 48 hrs. | |
| Reserpine | 200 | 1 | 4 | 5 | 6 | 7 | 7 | 8 | 7 | 1 | 0 | 0 |
| | 500 | 1 | 15 | 19 | 21 | 21 | 20 | 21 | 6 | 1 | 1 | 1 |
| | 1,000 | 7 | 23 | 28 | 26 | 23 | 27 | 25 | 23 | 6 | 2 | 1 |
| | 2,000 | 20 | 28 | 30 | 31 | 30 | 31 | 30 | 30 | 29 | 15 | 7 |
| 6-ethyl reserpine | 200 | 2 | 7 | 21 | 22 | 23 | 22 | 23 | 27 | 23 | 6 | 2 |
| | 500 | 0 | 1 | 16 | 18 | 21 | 21 | 19 | 28 | 18 | 1 | 0 |
| | 1,000 | 2 | 14 | 24 | 27 | 28 | 27 | 24 | 27 | 31 | 28 | 14 |
| | 2,000 | 2 | 20 | 28 | 30 | 32 | 32 | 32 | 32 | 31 | 30 | 31 |

It appears from Scheme I that compared to every dose of reserpine except the highest one, 6-ethyl reserpine is more effective during a 48 hour period even at small dosages.

Reserpine shows a maximum effect 4 to 24 hours after injection depending on the dosage. Thereafter, its activity decreases.

On the other hand, a decrease in activity of 6-ethyl reserpine is observed only 2 to 3 days after injection.

Comparisons between 6-methyl reserpine and reserpine according to this test show that the activity of 6-methyl reserpine is more intense and more lasting in comparison with that of reserpine.

The data are summarized in the following scheme.

The number of falls are expressed in average figures during a period of 4 minutes and by mice

| Drug | Dosage, mg./kg. | Number of falls after— | | | | | |
|---|---|---|---|---|---|---|---|
| | | 1 hr. | 4 hrs. | 24 hrs. | 48 hrs. | 72 hrs. | 96 hrs. |
| Reserpine | 0.5 | 1.5 | 1.4 | 0.4 | 0 | 1 | 2.1 |
| | 1 | 5.3 | 8.9 | 6 | 0.2 | 0.2 | 0.6 |
| | 2 | 14.7 | 19.1 | 20 | 6.5 | 2.6 | 0.6 |
| | 5 | 18.4 | 30.4 | 27.3 | 9.2 | 5 | 0 |
| | 10 | 22.8 | 32 | 28.5 | 8.4 | 5.8 | 2.5 |
| 6-methyl reserpine | 0.5 | 2 | 3.9 | 5.8 | 2.7 | 0.4 | 0.2 |
| | 1 | 7.6 | 12.6 | 18.5 | 10.3 | 5.5 | 0.8 |
| | 2 | 13.7 | 17.7 | 22.7 | 15 | 10.3 | 4.1 |
| | 5 | 17.6 | 17.9 | 29.9 | 15.8 | 10.8 | 5.2 |
| | 10 | 20 | 32 | 32 | 22.8 | 23.5 | 18.9 |

It appears clearly from this scheme that at any dosage the depressive action on the Central Nervous System of 6-methyl reserpine is many times more acute than that of reserpine and that the depressive action of 6-methyl reserpine lasts 72 to 96 hours while that of reserpine lasts 48 hours.

III. HYPOTENSIVE EFFECT

The hypotensive effect of 6-ethyl reserpine has been studied on hypertensive rats. Experimental hypertension is caused in rats by implanting pellets of desoxycorticosterone acetate and, at the same time, giving the animal drinking water containing 0.9% of salt.

The hypotensive action of 6-ethyl reserpine is much longer lasting than that of reserpine as is evident from the following table.

| Compound | Dose, mg./kg. | After 0 hr., cm. | After 1 hr., cm. | After 3 hrs., cm. | After 5 hrs., cm. | After 6 hrs., cm. |
|---|---|---|---|---|---|---|
| 6-ethyl reserpine | 0.1 | 19 | 16 | 17 | 14.5 | 13 |
| | 0.2 | 19 | 15.5 | 12.5 | 13 | 10.5 |
| Reserpine | 0.1 | 19 | 14.5 | 14.5 | 19 | 19 |
| | 0.2 | 19 | 16 | 16.5 | 16 | 18.5 |

IV. WALTZING MOUSE TEST

Mice injected with imino-dipropionitrile exhibit a distinctly characteristic agiation of circular movements and "shakes". These circular movements and "shakes" are more effectively arrested and over a longer period of time after injection of an appropriate dose of 6-methyl reserpine (1 mg./kg.) than after an injection of reserpine.

V. TOXICITY

The maximum tolerated daily dose over long periods of time was determined on rats by daily subcutaneous injection of varying amounts of 6-methyl reserpine. This was compared with that previously observed when administering reserpine over prolonged periods. The maximum tolerated daily dose of 6-methyl reserpine was 10 to 20 γ/kg. without undesirable effects as compared to doses of between 50 and 100 γ/kg. for reserpine.

All these tests prove that 6-ethyl reserpine has a considerably more prolonged hypotensive effect than reserpine. 6-methyl reserpine has physiological properties qualitatively comparable to those of reserpine but distinctly more intense in reaction at comparative dosages. The new compositions, thus, represent a highly meritorious advance in the art of hypotensive agents.

Of course, many changes and variations in the reactants used, the reaction conditions, temperature, and duration employed, solvents, acids, or bases used, the order of introducing the reactants into the reaction mixture, the methods of working up and of purifying the reaction products and the like may be made by those skilled in the art in accordance with the principles set forth herein and in the claims annexed hereto.

We claim:

1. A compound selected from the group consisting of an alkylated levorotatory reserpine of the formula wherein R is methyl and the symbol ξ designates a configuration selected from the group consisting of α and β, and its therapeutically-acceptable acid addition salts.

2. Levorotatory 6-methyl reserpine.

3. The levorotatory 6a-methyl reserpine having a specific rotation $[\alpha]_D^{20} = -87°$ (c.=0.25% in chloroform).

4. The levorotatory 6b-methyl reserpine having a specific rotation $[\alpha]_D^{20} = -134°$ (c.=0.5% in chloroform).

References Cited

UNITED STATES PATENTS 2,883,384  4/1959  Woodward _____ 260—28
3,058,992  10/1962  Allais et al. _____ 260—31

FOREIGN PATENTS 1,211,514  10/1959  France.
1,247,322  10/1960  France.

OTHER REFERENCES

Velluz et al., I (Velluz, Muller and Allais), Acad. des Sci.-Comptes Rendus, vol. 247 (Nov. 17, 1958), pp. 1746–8.

Velluz, Annales de Pharm. Franc., vol. 17, January 1959, pp. 22 and 23.

WALTER A. MODANCE, *Primary Examiner.*

JAMES A. PATTEN, *Assistant Examiner.*